US010377614B2

(12) United States Patent
Borntrager et al.

(10) Patent No.: US 10,377,614 B2
(45) Date of Patent: Aug. 13, 2019

(54) CONTAINER TRANSPORT SYSTEM AND METHOD

(71) Applicants: Steven Borntrager, Grayson, KY (US); James Borntrager, Carrier Mills, IL (US)

(72) Inventors: Steven Borntrager, Grayson, KY (US); James Borntrager, Carrier Mills, IL (US)

( * ) Notice: Subject to any disclaimer, the term of this patent is extended or adjusted under 35 U.S.C. 154(b) by 331 days.

(21) Appl. No.: 15/379,466

(22) Filed: Dec. 14, 2016

(65) Prior Publication Data
US 2017/0174452 A1 Jun. 22, 2017

Related U.S. Application Data

(60) Provisional application No. 62/268,385, filed on Dec. 16, 2015.

(51) Int. Cl.
*B66F 9/075* (2006.01)
*B60P 1/43* (2006.01)
(Continued)

(52) U.S. Cl.
CPC .......... *B66F 9/07563* (2013.01); *B60P 1/435* (2013.01); *B60P 1/6418* (2013.01); *B66F 9/06* (2013.01); *B66F 9/07581* (2013.01)

(58) Field of Classification Search
CPC ...... B60P 3/064; B60P 1/435; B66F 9/07563; B66F 9/07513; B66F 9/07581;
(Continued)

(56) References Cited

U.S. PATENT DOCUMENTS 3,025,985 A * 3/1962 Crawford .................. B60P 3/07
280/400
3,561,621 A * 2/1971 Rivers, Jr. ................. B60P 1/00
220/1.5
(Continued)

FOREIGN PATENT DOCUMENTS

CN 201777179 U 3/2011
GB 2453338 A * 4/2009 ............ B60G 9/003

OTHER PUBLICATIONS

"Robo-Unit Portable Storage," http://www.toolsnob.com/archives/2010/08/robo-unit_portable_storage.php (Accessed on Aug. 25, 2015) 5pgs.

*Primary Examiner* — Glenn F Myers
(74) *Attorney, Agent, or Firm* — Richard C. Litman

(57) ABSTRACT

The container transport system and method provides for the transport of portable storage units. The system includes a powered hand truck, a specially configured vehicle, and a pair of dolly wheel sets for installation to one end of the portable storage unit. The method comprises removal of the hand truck from the vehicle, fitting the dolly wheels to one end of the portable storage unit as needed, lifting the opposite end of the portable storage unit using the powered hand truck, maneuvering the portable storage unit onto the vehicle using the powered hand truck while simultaneously lifting the end of the portable storage unit supported by the hand truck to keep the portable storage unit level, and parking the powered hand truck on the rearward portion of the vehicle. The hand truck may be remotely controlled, and the dolly sets are preferably height adjustable.

5 Claims, 11 Drawing Sheets

(51) Int. Cl.
*B60P 1/64* (2006.01)
*B66F 9/06* (2006.01)

(58) Field of Classification Search
CPC .......... B66F 9/07572; B66F 9/12; B66F 5/00;
B66F 5/02; B66F 5/025; B66F 5/04;
B60Y 2200/15
See application file for complete search history.

(56) References Cited

U.S. PATENT DOCUMENTS

| | | | |
|---|---|---|---|
| 4,078,677 A | | 3/1978 | Huggins, Jr. et al. |
| 4,180,363 A | * | 12/1979 | Steiger ................ B66F 9/07563 414/347 |
| 4,712,966 A | * | 12/1987 | Gross ........................ B60P 3/41 108/55.3 |
| 4,792,274 A | * | 12/1988 | Cockram ................ B60P 1/433 14/71.1 |
| 4,966,510 A | * | 10/1990 | Johnson, Jr. .............. B60P 3/08 410/24 |
| 5,033,931 A | * | 7/1991 | Mann ........................ B60P 1/24 296/57.1 |
| 7,597,522 B2 | | 10/2009 | Borntrager et al. |
| 7,871,089 B1 | | 1/2011 | Henderson |
| 7,909,355 B2 | * | 3/2011 | Thedford .................. B60P 3/07 280/491.1 |
| 8,186,931 B2 | * | 5/2012 | Borntrager .............. B66F 9/065 187/231 |
| 8,393,837 B1 | * | 3/2013 | Lien ........................ B60P 3/122 410/3 |
| 2016/0325972 A1 | * | 11/2016 | Taylor ..................... B66F 9/065 |

* cited by examiner

CONTAINER TRANSPORT SYSTEM AND METHOD

CROSS-REFERENCE TO RELATED APPLICATION

This application claims the benefit of U.S. Provisional Patent Application Ser. No. 62/268,385, filed Dec. 16, 2015.

1. FIELD OF THE INVENTION

The present invention relates generally to containerized freight handling systems, and particularly to a container transport system and method for loading, transporting, and depositing a portable storage unit or container.

2. DESCRIPTION OF THE RELATED ART

Portable storage units (PSUs) or containers have become increasingly popular for the transport and storage of household goods and furniture, as well as relatively large quantities of other goods and material. Such storage units or containers have conventional dimensions of twelve to sixteen feet in length, and eight feet in width and height. Such containers have weights of several hundred pounds when empty, and of course can weigh perhaps a few thousand pounds when loaded, depending upon the contents. It will be seen that such PSUs or containers can be difficult to transport from place to place, given their sizes and potential weights and lack of wheels.

One concern when moving and transporting such PSUs is the desirability of keeping the PSU, and thus its contents, level. Conventional loading of such PSUs onto a flatbed results in the forward end of the PSU, i.e., the end closest to the flatbed, rising as it travels up the ramp to the flatbed, while the opposite end remains at a lower level just clear of the ground. Tilting the PSU container may result in its contents tipping or falling and being damaged within the PSU, if those contents are not well secured.

Accordingly, various devices and systems for transporting such PSUs or containers, as well as other large and heavy containers and storage units, have been developed in the past. An example of such is found in Chinese Patent Publication No. 201777179 published on Mar. 30, 2011 to Stanley Factory Israel Co. Ltd. This reference describes (according to the drawings, English Abstract, and machine translation) a portable storage container configured to fit into the cargo box of a conventional pickup truck. A channel is formed longitudinally in the bottom of the container, with a mating track installed in the floor of the cargo bed of the pickup truck. The track engages the channel to secure the container positively in place for transport.

Thus a container transport system and method solving the aforementioned problems is desired.

SUMMARY OF THE INVENTION

The container transport system includes three basic components, i.e., a powered hand truck, a specially configured vehicle, such as a trailer or a truck, such as a flatbed truck, and a pair of dolly wheel sets for supporting one end of a portable storage unit (PSU) or container while the container is being maneuvered onto or from the vehicle. The method of loading the container onto the vehicle for transport includes (a) removal of the powered hand truck from the vehicle, (b) fitting the dolly wheel sets to one end of the container as necessary, (c) lifting the opposite end of the container using the powered hand truck to level the PSU just clear of the underlying surface, (d) maneuvering the end of the container supported by the dolly wheels onto the vehicle, (e) raising the end of the PSU supported by the powered hand truck to keep the PSU substantially level as the opposite end supported by the dolly wheels travels up the ramp and onto the vehicle, and (f) parking the powered hand truck and its supported end of the container in position on the rear of the vehicle. The method for offloading the container from the vehicle essentially reverses the above steps.

The powered hand truck is preferably a device as described in U.S. Pat. No. 8,186,931 issued on May 29, 2012 to Steven Borntrager et al., incorporated herein by reference. The powered hand truck may be controlled directly by an operator manipulating the controls of the device, or may alternatively be controlled remotely. The vehicle includes a rearwardly disposed receptacle for securing the powered hand truck for transport and a sloping rearward ramp, with the rearmost portion of the ramp being hinged to fold upward in order to serve as a gate when raised. The dolly wheel sets are height adjustable.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
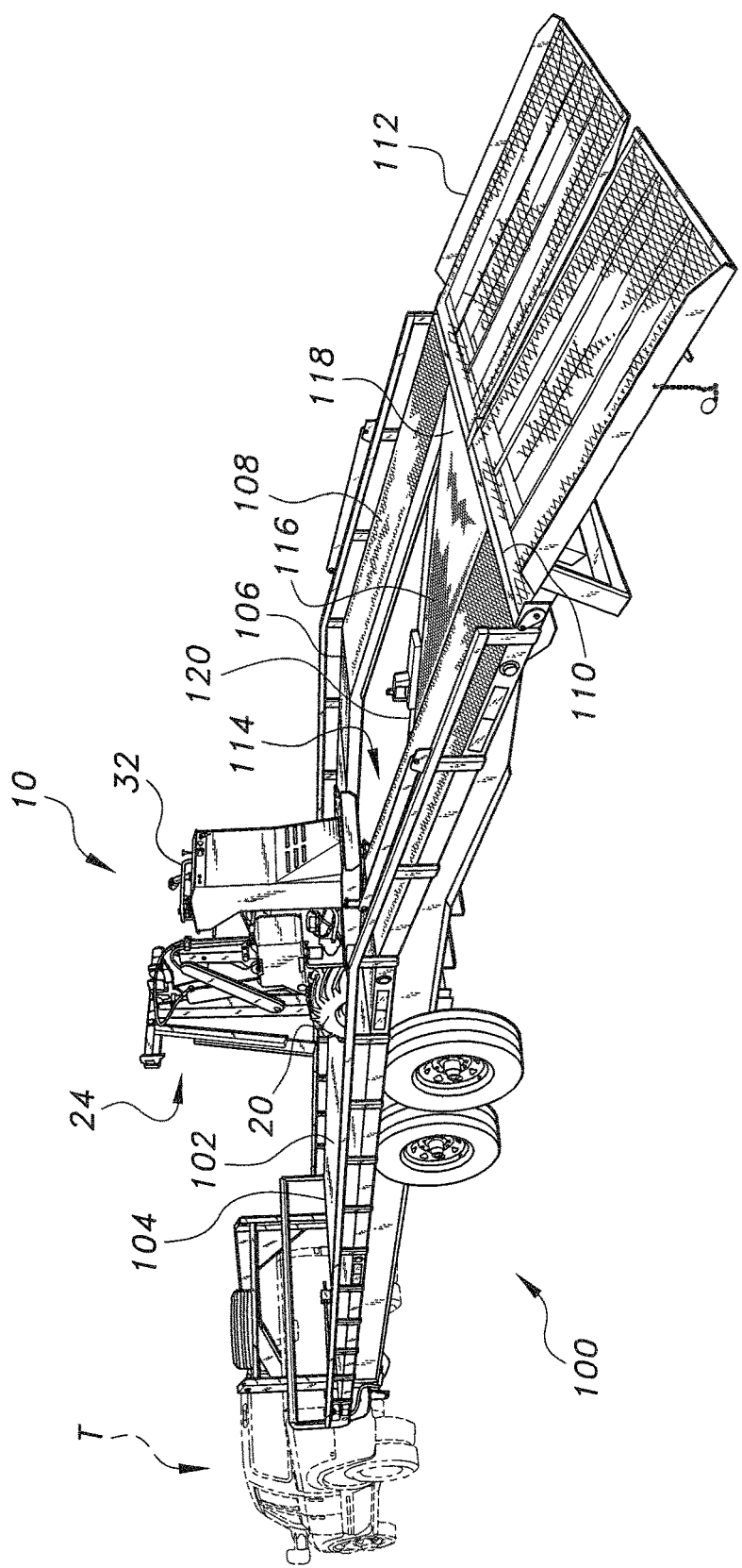
FIG. 1 is a perspective view of a vehicle (trailer) and powered hand truck of a container transport system and method according to the present invention, illustrating various features thereof.

The container transport system and method provides for the transport and handling of large portable storage units (PSUs), often used for the transport and storage of household goods and other materials, as well as other types of containers, such as shipping containers, that can have any suitable length, such as a length of up to 40 ft. Given their size and weight, particularly when loaded, and lack of wheels, such containers are not amenable to manual handling and some form of power equipment and machinery must be used for handling such PSUs.

The container transport system can include a powered hand truck 10, illustrated in FIGS. 1-3, 5, and 7-10. The powered hand truck 10 can be a machine generally as described in U.S. Pat. No. 8,186,931 issued on May 29, 2012 to Steven Borntrager et al., incorporated herein by reference. The powered hand truck 10 includes a chassis 12 having a drive axle end 14 and an opposite caster wheel end 16, most clearly shown in FIG. 3 of the drawings. A single axle extends laterally across the drive axle end 14 of the chassis 12, with the axle having opposed first and second ends. Only the second end 18 of the axle is shown in the drawing Figs., but it will be seen that the first and second drive wheels 20 and 22 extend from the respective first and second ends of the axle, as in the structure described in the Borntrager et al. '931 U.S. patent cited further above.

A forklift height adjustment mechanism 24 extends from the drive axle end 14 of the chassis 12, with a fork attachment arm 26 extending laterally across the lower portion of the mechanism 24. A pair of laterally spaced fork tines including first and second tines extends from the fork attachment arm 26. As in the case of the first and second axle ends, only the second tine 28 is illustrated in the drawing Figs., but the powered hand truck 10 includes two such tines as described in the '931 U.S. patent.

A prime mover 30, e.g., an internal combustion engine, electric motor, etc., is installed generally medially on the chassis 12, to drive the two drive wheels 20, 22 and the forklift height adjustment mechanism 24. A control system 32, located on a pedestal adjacent the caster wheel end 16 of the chassis 12, enables an operator to control the prime mover 30, the first and second drive wheels 20 and 22, and the forklift height adjustment mechanism 24, as described in the '931 U.S. patent cited further above. The operator may stand upon a platform at the caster wheel end 16 of the chassis 12 and operate the control system 32 therefrom, or may alternatively operate the powered hand truck 10 remotely, as provided in the cited '931 U.S. patent.

Figure 11:
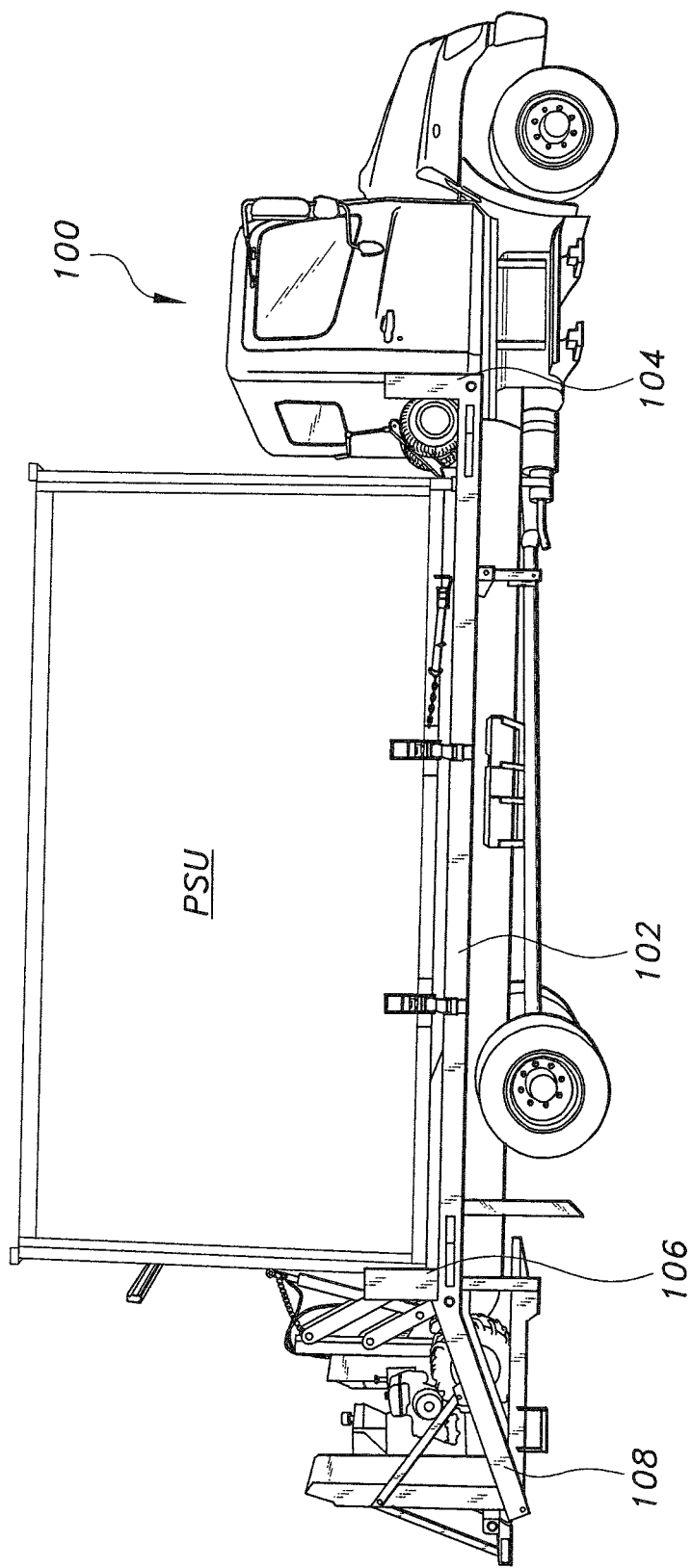
FIG. 11 is a side view of the portable storage container and powered hand truck loaded onto the vehicle (truck) of the container transport system and method according to the present invention, with the rear ramp and gate of the vehicle raised.

Both the PSU and the powered hand truck 10 can be mounted upon a flat bed 102 of a vehicle 100, such as a truck or trailer. If mounted on the flat bed 102 of a trailer, the trailer can in turn be towed by a suitable vehicle, e.g., a light truck T or the like as shown in broken lines in FIGS. 1 and 8. FIG. 11 shows the PSU mounted on the flat bed 102 of a truck. The flat bed 102 can have a forward or hitch end 104 and an opposite rear or ramp end 106. A downward and rearward sloping ramp 108 extends from the ramp end 106 of the flat bed 102. The ramp 108 has a rearward end 110, with a rearward ramp extension and gate 112 hingedly attached to the rearward end 110 of the ramp 108.

The flat bed 102 includes a powered hand truck receptacle 114 disposed therein, adjacent to the ramp end 106 of the flat bed 102. The ramp 108 includes a central area 116 having a rearward end 118 that is aligned or contiguous with the rearward end 110 of the ramp 108, and an opposite forward end 120 that is aligned or contiguous with the floor of the receptacle 114. This configuration results in the plane of the central area 116 of the ramp 108 and the plane of the powered hand truck receptacle 114 being essentially parallel to the flat bed 102, with the receptacle 114 disposed below the plane of the flat bed 102 (e.g., below the plane of a remaining portion of the flat bed 102) due to the forward and upward slope of the ramp 108 to the rearward or ramp end 106 of the flat bed 102. Thus, the powered hand truck receptacle 114 may be considered as a forward portion of the central area 116 of the ramp 108 or to extend to the rear end 110 of the ramp 108, or in other words, the central area 116 of the ramp 108 may be seen as a rearward extension of the powered hand truck receptacle 114.

The third major component of the system comprises a pair of container support dolly sets 200 that are used to support one end of the PSU or container during the transfer operation to and from the vehicle 100, as shown in FIGS. 4 through 8. Each of the dolly sets 200 includes a pair of closely spaced wheels 202 with a single fork tine 204 extending from between the wheels 202. An upright member 206 extends upward from between the two wheels 202, with the base of the fork tine 204 being adjustably attached to the base of the upright 206. The upright 206 provides for the adjustment of the height of the single fork tine 204, e.g., a conventional screw jack mechanism within the upright 206, or other means as desired. A crank 208 extends from the top of the upright 206 for operation of the screw jack mechanism.

Figure 2:
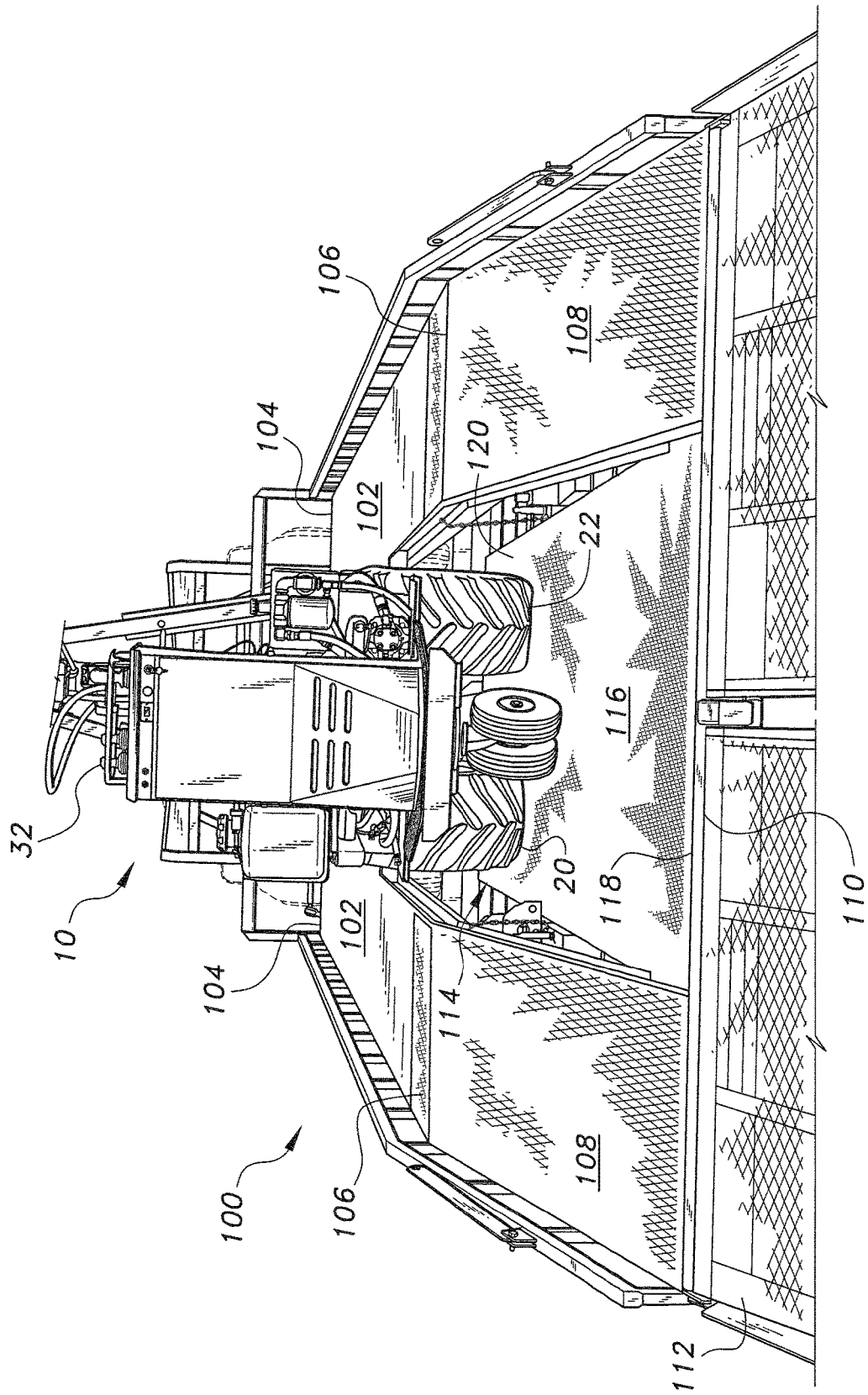
FIG. 2 is a rear perspective view of the vehicle and powered hand truck of the container transport system and method according to the present invention, illustrating further details thereof.

The method of placing a PSU or container on the vehicle 100 is illustrated generally in sequence in the drawing Figs. As the conventional PSU is not equipped with wheels, some form of wheeled mechanism or mechanisms must be provided for moving the PSU on the surface. Accordingly, the vehicle 100 is transported to the site of the PSU to convey the PSU after it is loaded onto the vehicle 100. The powered hand truck 10 and the container support dolly sets 200 can be carried to the site by the vehicle 100. When the vehicle 100 has arrived at the site of the PSU, the rear ramp extension and gate 112 is lowered to enable the powered hand truck 10 to be driven off the vehicle 100 from its receptacle 114, generally as shown in FIGS. 1 and 2 of the drawings.

Figure 3:
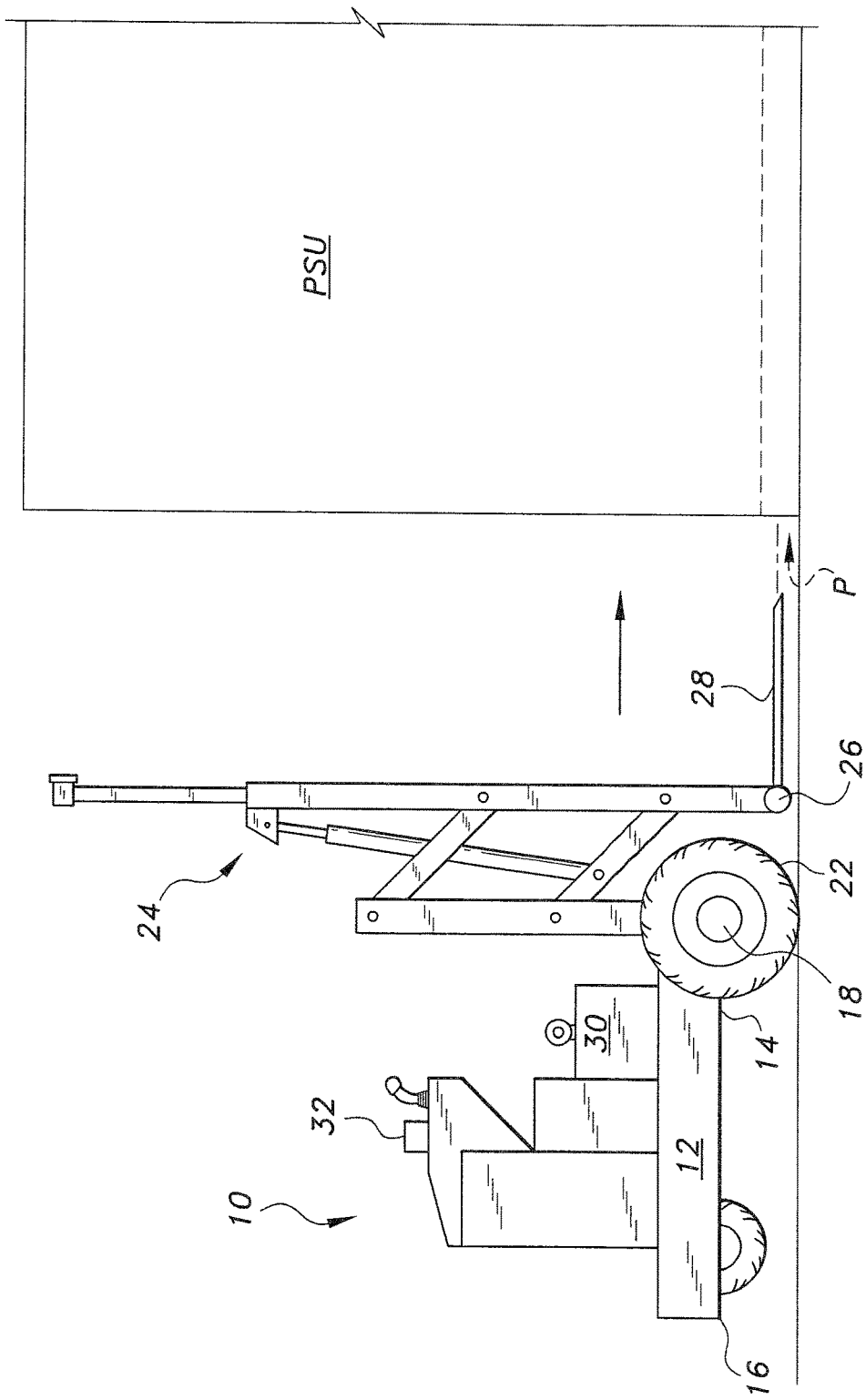
FIG. 3 is a side elevation view of the powered hand truck of the container transport system and method according to the present invention, showing the engagement with a portable storage container.

Once the powered hand truck 10 has been removed from the vehicle 100, it is maneuvered to align its fork tines with the corresponding fork tine pockets P at one end of the PSU, generally as shown in FIG. 3 of the drawings. The height of the two fork tines is adjusted for insertion into the tine pockets P, as shown by the right tine 28 in FIG. 3, and the powered hand truck 10 is driven toward the PSU (either directly by an on-board operator, or by remote control) to insert the two tines into the pockets P of the PSU. The forklift height adjustment mechanism 28 of the powered hand truck 10 is operated (again, either directly or remotely) to lift that end of the PSU just clear of the underlying surface, with support of that end of the PSU being solely by the two drive wheels 20 and 22 of the powered hand truck 10.

Figure 4:
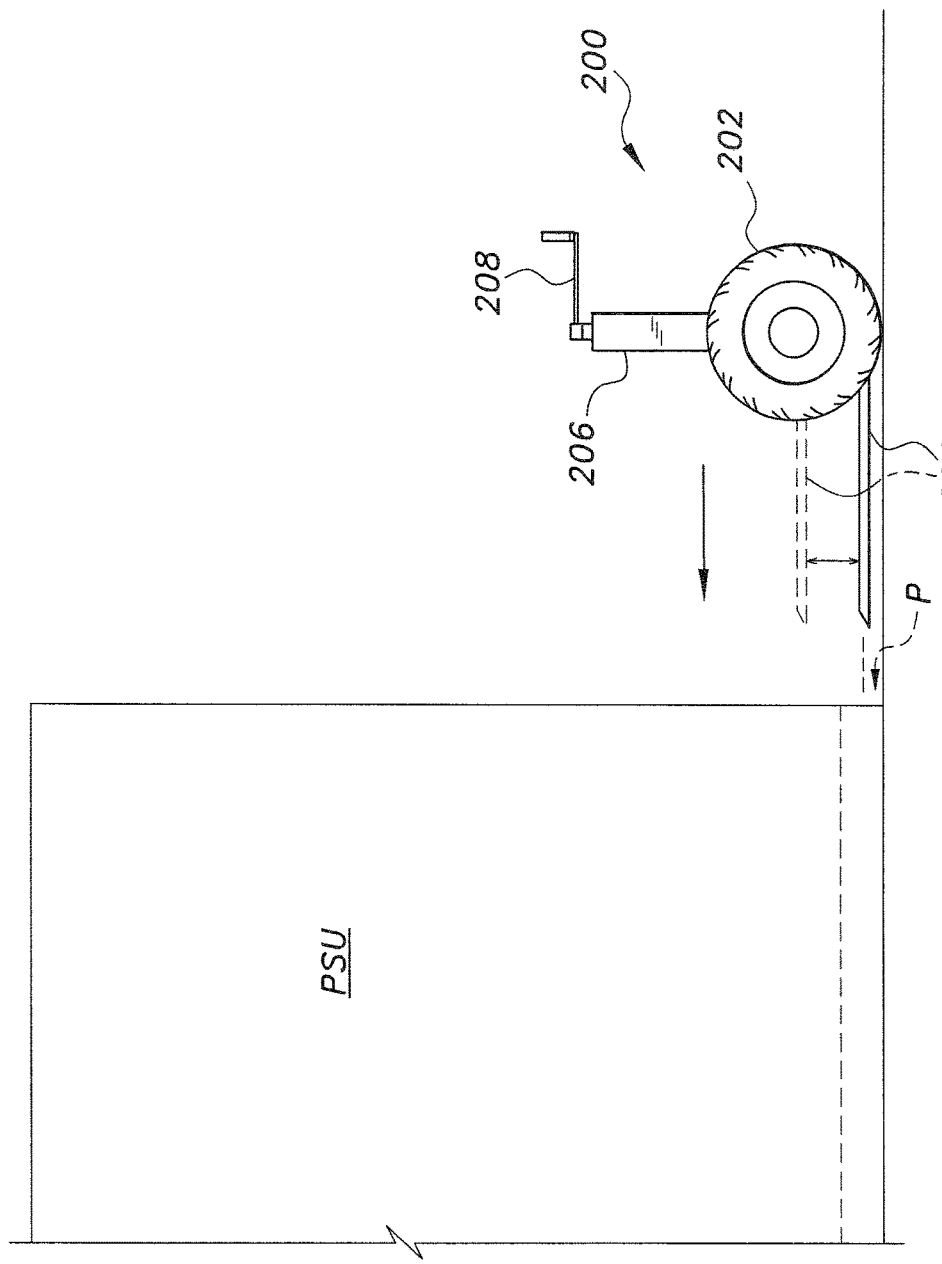
FIG. 4 is a side elevation view of one of the two dolly wheel sets of the container transport system and method according to the present invention, showing its engagement with a portable storage container.
Figure 5:
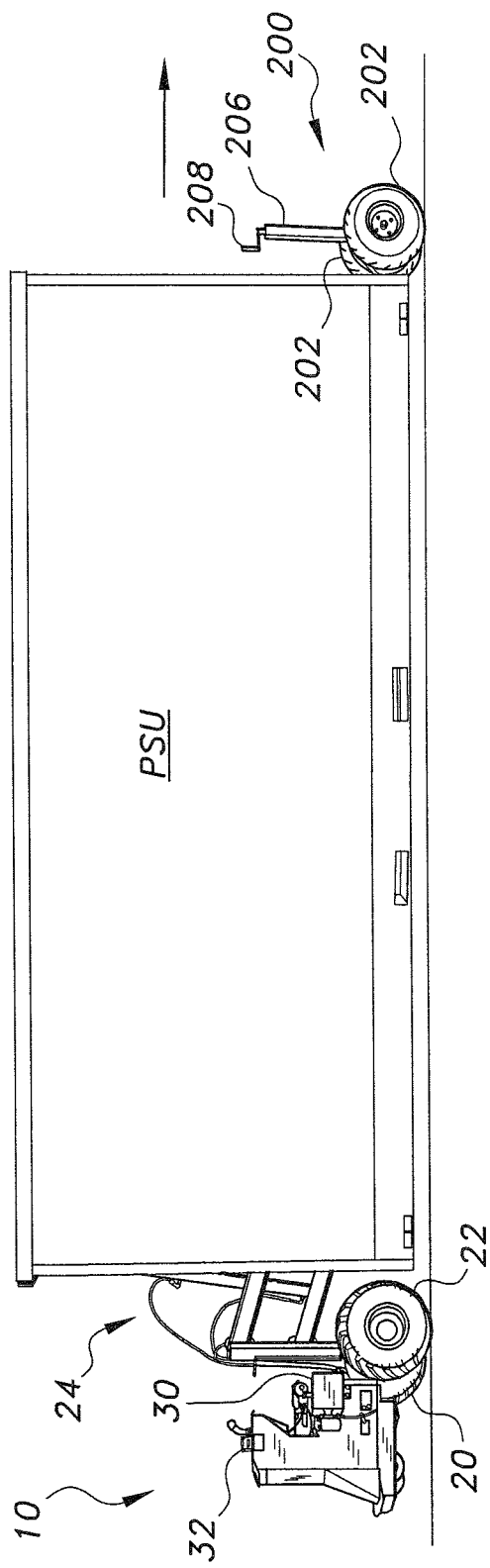
FIG. 5 is a right side perspective view of the powered hand truck of the container transport system and method according to the present invention, showing the truck lifting and maneuvering one end of a portable storage container.

At this point, the the—two container support dolly sets 200 may be positioned to support the opposite end of the PSU, generally as shown in FIG. 4 of the drawings. Such PSUs conventionally include fork tine pockets P at each end thereof. The height of the fork tine 204 of each dolly 200 is adjusted as required to engage the fork tine pockets P at one end of the PSU and the two dollies 200 are maneuvered to insert their tines 204 into the corresponding tine pockets P at one end of the PSU, generally as shown in FIG. 4 of the drawings. The hand cranks 208 (or other tine lifting mechanism as may be installed in the dollies 200) are manipulated to raise the dolly tines 204, thus lifting that end of the PSU just clear of the underlying surface and level with the opposite raised end, with sole support of that end of the PSU being by means of the four wheels 202 of the two dollies 200. Thus, the entire PSU is supported in a substantially level elevation, clear of the underlying surface at this point, by the two drive wheels 20 and 22 of the powered hand truck 10 and the four wheels 202 of the two container support dollies 200, generally as shown in FIG. 5 of the drawings. Alternatively, the two dolly sets 200 can be engaged with the tine pockets of the PSU prior to engaging the powered hand truck 10 with the PSU.

Figure 6:
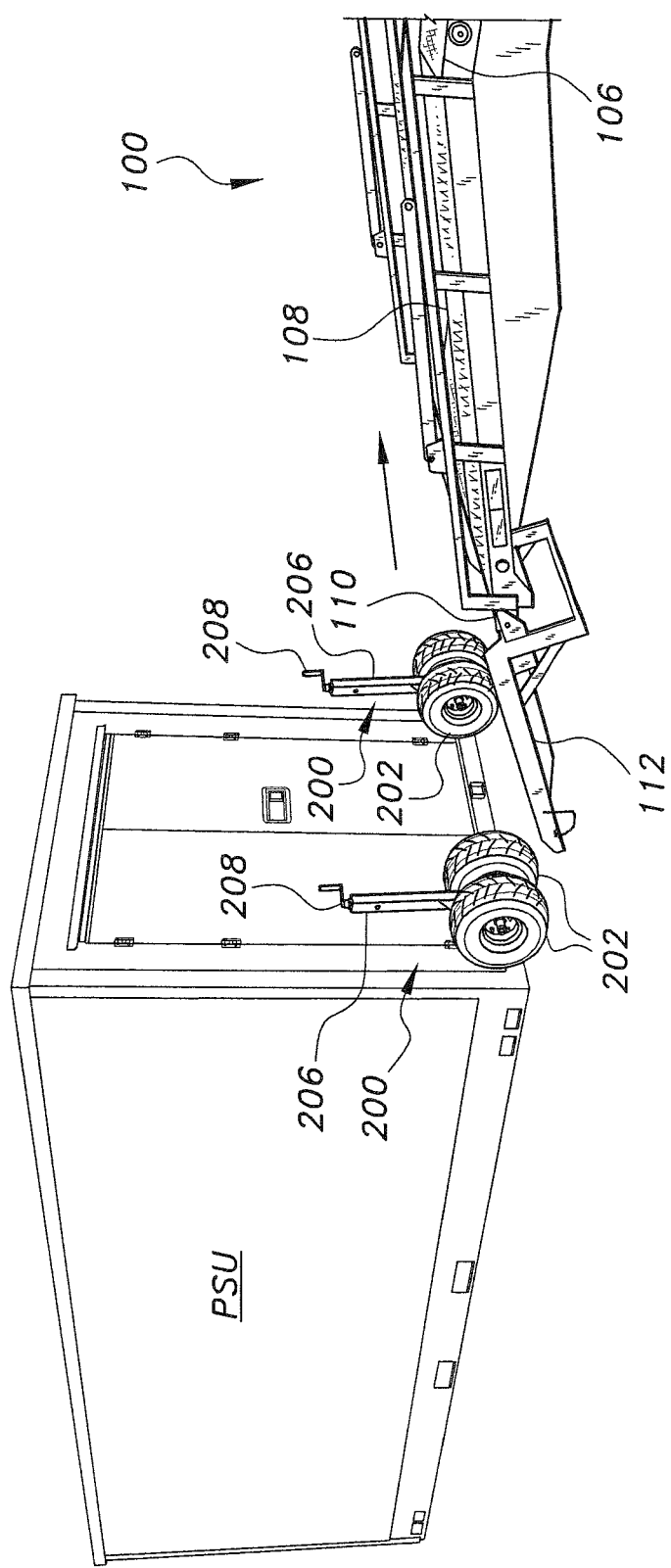
FIG. 6 is a front perspective view of a portable storage container supported by a pair of dolly wheel sets of the container transport system and method according to the present invention, approaching the rear ramp of the vehicle for loading thereon.
Figure 7:
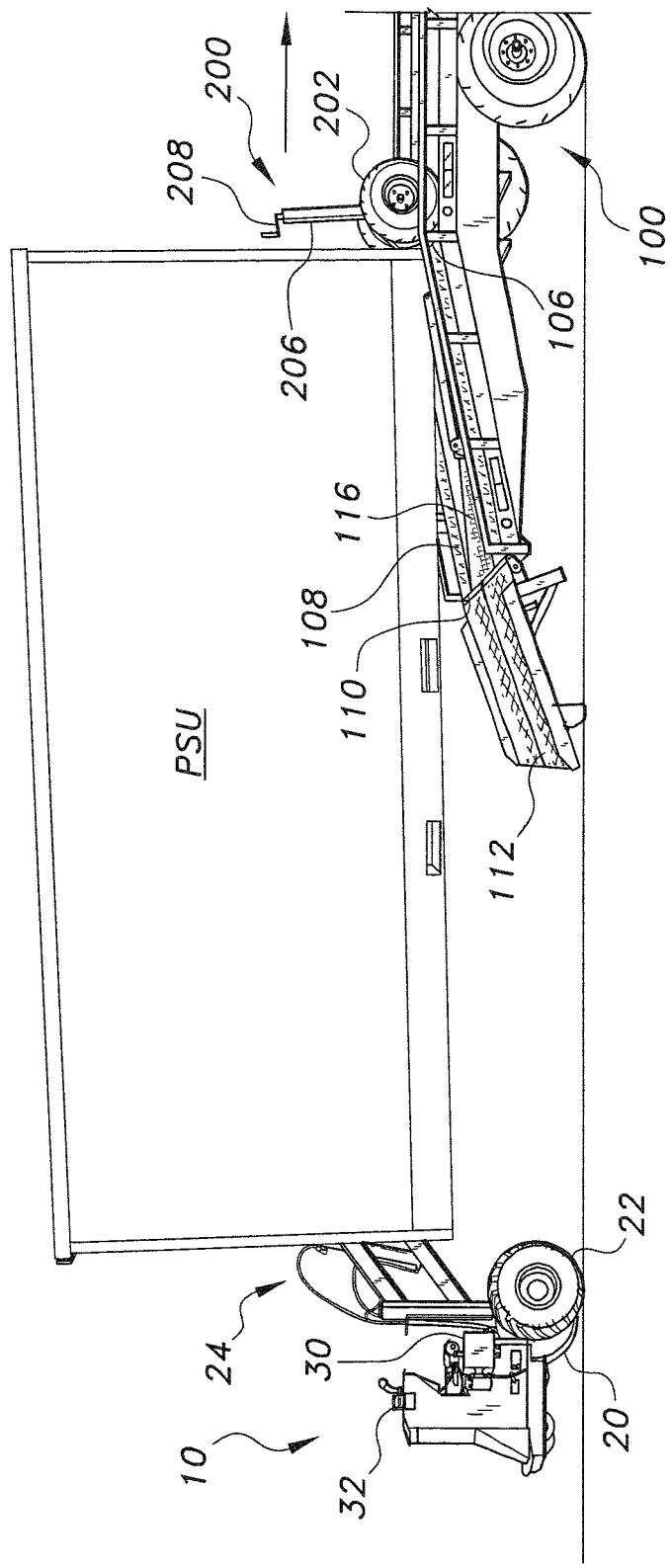
FIG. 7 is a right side perspective view of the powered hand truck loading a portable storage container onto the vehicle of the container transport system and method according to the present invention, with the container positioned partially onboard the vehicle.

The powered hand truck 10 is then operated to maneuver the end of the PSU supported by the support dollies 200 to the distal end of the deployed ramp extension 112 of the vehicle 100, generally as shown in FIG. 6 of the drawings. The powered hand truck 10 is driven forward further, i.e., toward the vehicle 100, to roll the two support dollies 200 up the ramp extension 112 and further up the ramp 108 of the vehicle 100, generally as shown in FIG. 7 of the drawings. A major advantage provided by the powered hand truck 10 is that the forklift height adjustment mechanism 28 can be operated to lift its supported end of the PSU as the opposite dolly supported end rises up the ramp extension 112 and ramp 108 of the vehicle 100. In this manner, the PSU and its contents can be maintained at a level orientation at all times.

Figure 8:
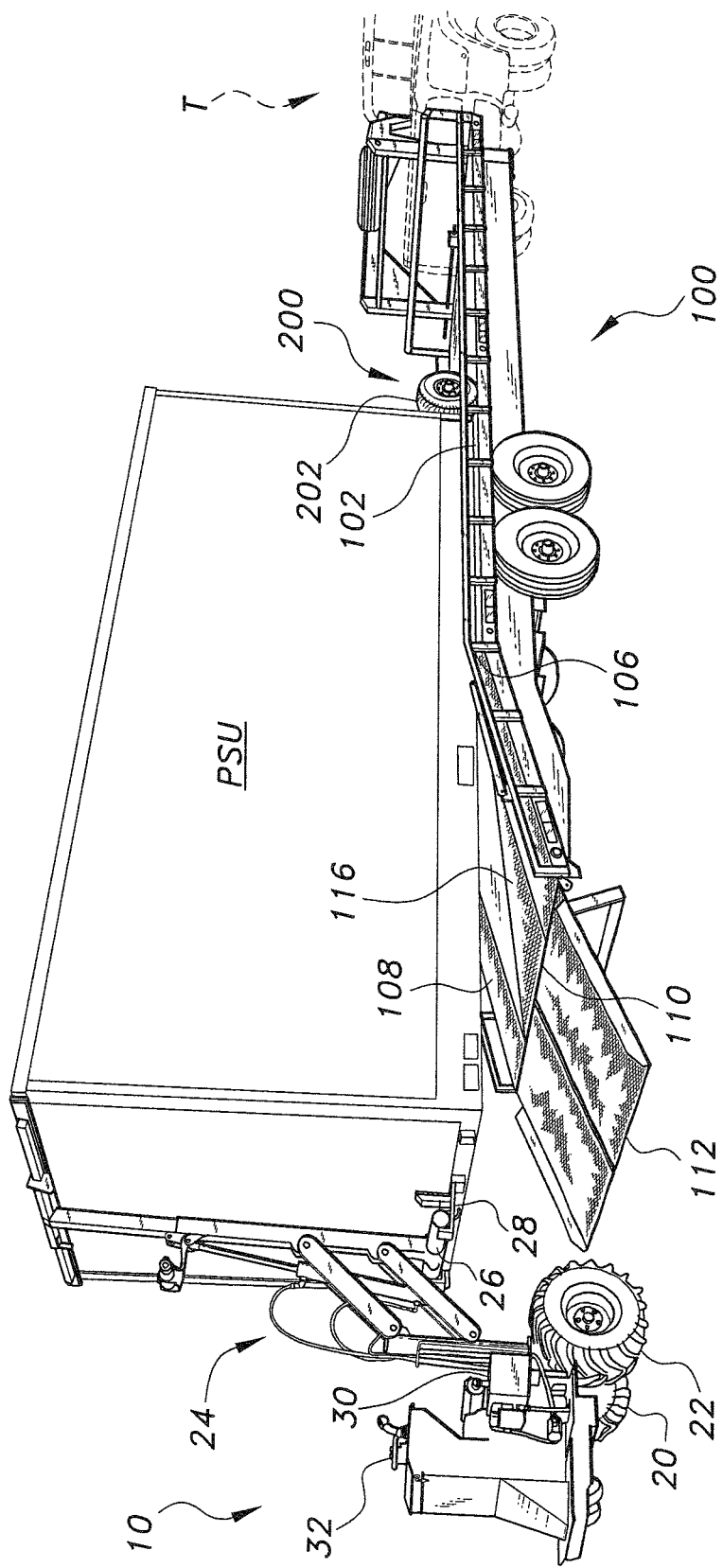
FIG. 8 is a right side and rear perspective view of the powered hand truck loading a portable storage container onto the vehicle of the container transport system and method according to the present invention, with the container positioned approximately half way onboard the vehicle.

The powered hand truck 10 is driven further forward, i.e., toward the rear of the vehicle 100, with the wheels 202 of the two container support dolly sets 200 rolling onto the flat bed 102 of the vehicle 100. As the powered hand truck 10 is still on the surface below the level of the flat bed 102, the fork height adjustment mechanism 28 of the powered hand truck 10 is adjusted as required to lift the two fork tines, and thus the corresponding end of the PSU, to maintain the PSU at a level elevation or orientation, generally as illustrated in FIGS. 7 and 8 of the drawings.

Figure 9:
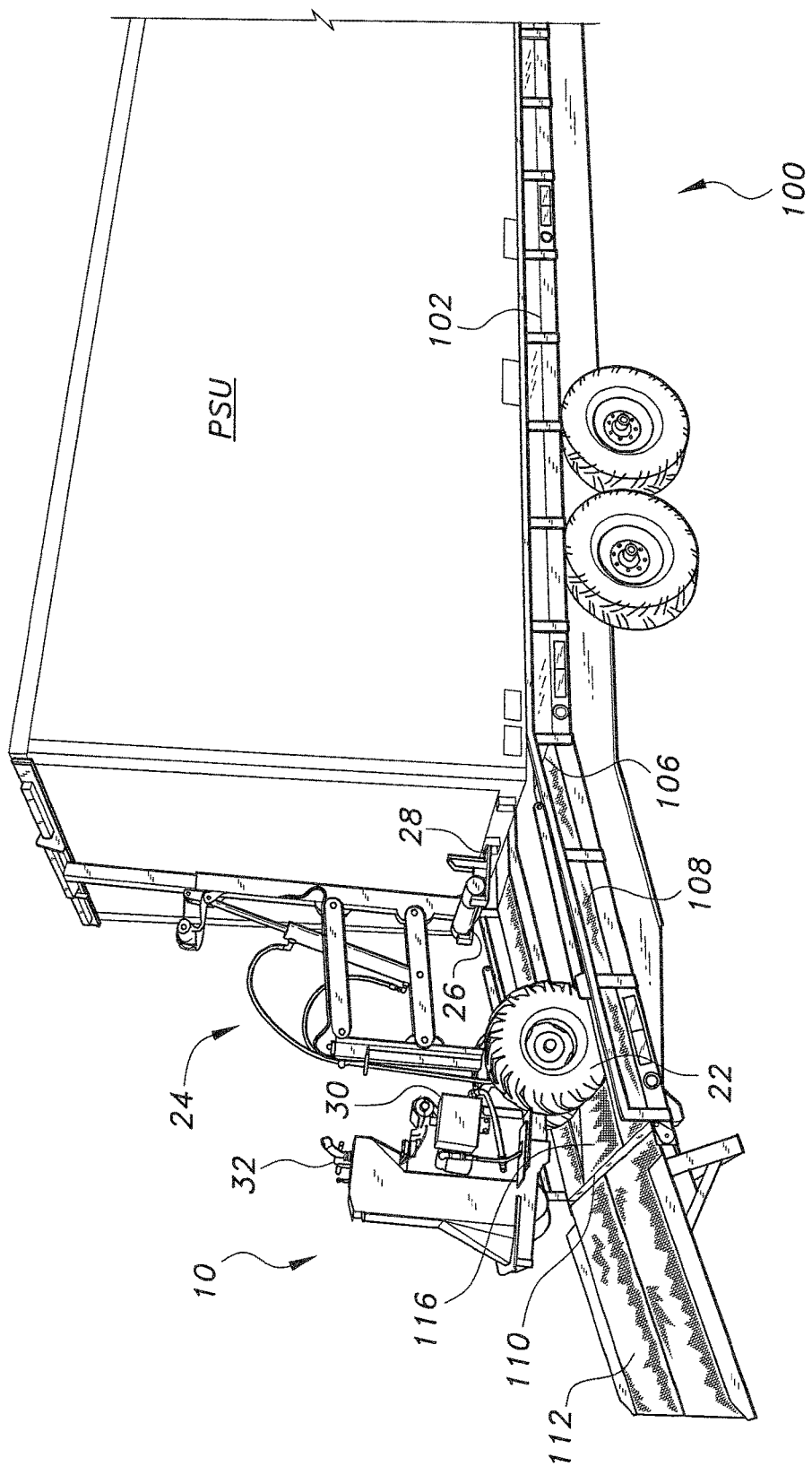
FIG. 9 is a right side and rear perspective view of the powered hand truck loading a portable storage container onto the vehicle of the container transport system and method according to the present invention, with the container completely aboard the vehicle.

It will be seen in FIG. 9 that once the powered hand truck 10 advances beyond the rearward end 110 of the ramp 108, it is traveling on the substantially level central area 116 of the ramp 108. The plane of this central area 116 of the ramp 108 is parallel to the plane of the flat bed 102, but at a lower level. Thus, the height of the forklift tines of the powered hand truck 10, and the PSU or container, can be maintained at a constant level as this step of the operation is accomplished.

Figure 10:
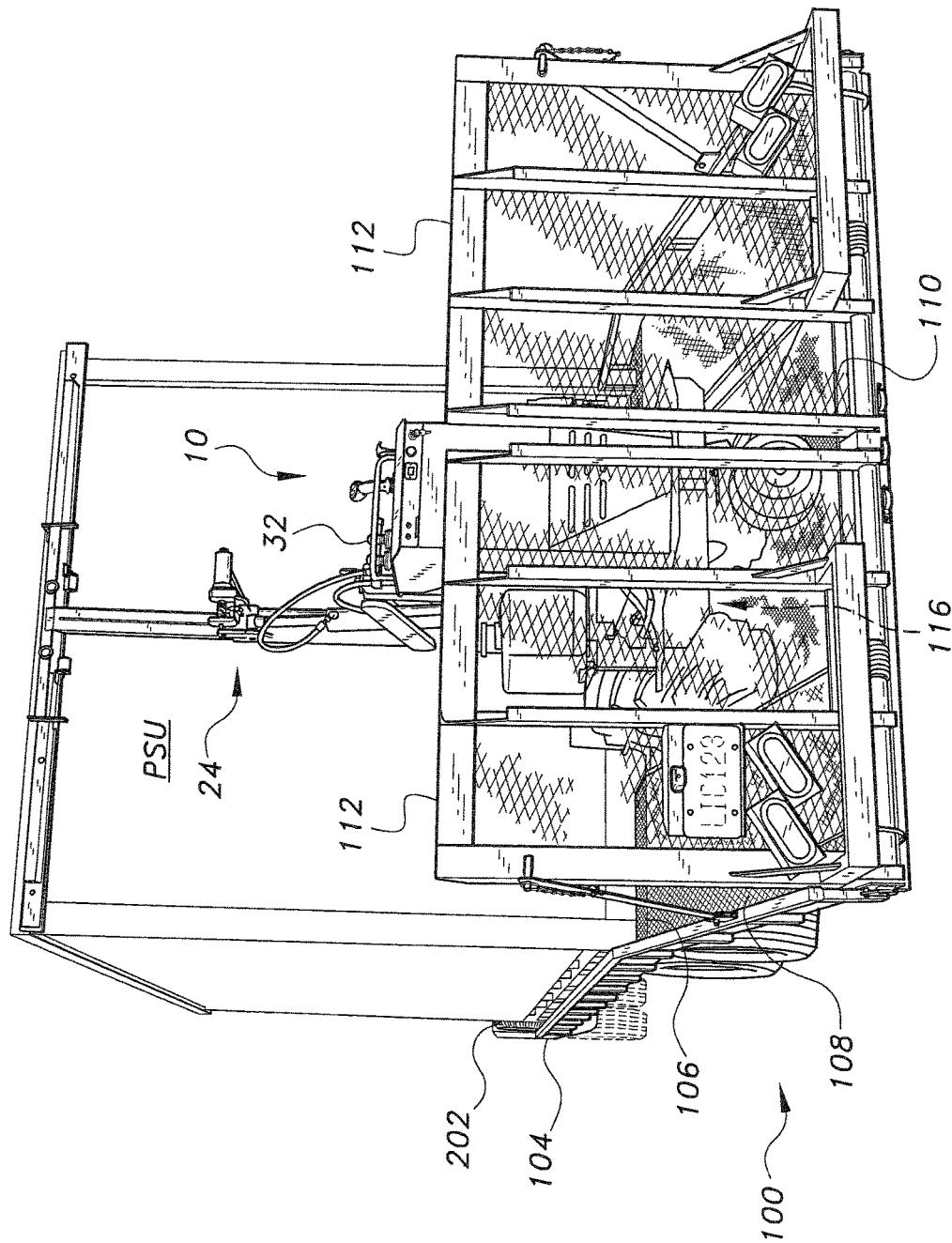
FIG. 10 is a rear perspective view of the portable storage container and powered hand truck loaded onto the vehicle of the container transport system and method according to the present invention, with the rear ramp and gate of the vehicle raised.

Finally, the forward end of the PSU, i.e., the end supported by the two container support dolly sets 200, is advanced to a point adjacent the forward or hitch end 104 of the flat bed 102, generally as shown in FIG. 10 of the drawings. The two dolly sets 200 remain in position with their fork tines engaged with the tine pockets of the PSU, but the tines can be lowered using the height adjustment mechanisms of the dolly sets in order to relieve the loads on the dolly sets and rest the bottom of the PSU directly upon the underlying flat bed 102. The fork tines of the powered hand truck 10 are lowered correspondingly.

The length of the flat bed 102 between its forward or hitch end 104 and ramp end 106 is established to be at least approximately equal to the length of a standard PSU, i.e., about sixteen feet. (This length may be adjusted as required for different PSUs.) This positions the rearward end of the PSU at the rear or ramp end 106 of the flat bed 102 with the powered hand truck 10 positioned within the central area 116 of the ramp 108, generally as shown in FIG. 10. It will be seen that the powered hand truck receptacle 114 is disposed to the forward end of this ramp central area 116, but may be considered to encompass the entire ramp central area 116 as well. This permits the powered hand truck 10 to be driven forward into the powered hand truck receptacle 114 when shorter PSUs are carried on board the vehicle 100. In any event, sufficient room is provided for the carriage of the powered hand truck 10 completely on the ramp central area 116 or the receptacle 114, thus permitting the ramp extension and gate 112 to be raised and secured as shown in FIG. 10 of the drawings. The fork lift mechanism 24 of the powered hand truck 10 is lowered to relieve the strain on the mechanism, and to seat the bottom of the PSU directly upon the underlying flat bed 102.

At this point, the vehicle 100 with its load of the PSU, powered hand truck 10, and the two container support dolly sets 200 is ready for transport for carriage of the PSU to whatever location may be required. When the vehicle 100 and its cargo arrive at the desired location, the above-described procedure is reversed to unload the PSU from the vehicle 100, and to position the PSU as desired at its new location. It is to be understood that the powered hand truck 10 can be easily moved and maneuvered to transport the PSU to and from narrow spaces or wet locations.

It is to be understood that the present invention is not limited to the embodiments described above, but encompasses any and all embodiments within the scope of the following claims.

We claim:

1. A container transport system, comprising:
   a powered hand truck including a chassis having a drive axle end and a caster wheel end opposite the drive axle end, a single axle extending laterally across the drive axle end of the chassis, the axle having a first end and a second end opposite the first end, first and second drive wheels disposed upon the first end and second end of the axle, respectively, a forklift height adjustment mechanism extending from the drive axle end of the chassis, a fork attachment arm extending laterally across the forklift height adjustment mechanism, a pair of laterally spaced apart fork tines extending from the forklift attachment arm, a prime mover selectively communicating with the first and second drive wheel and the forklift height adjustment mechanism, and a control system selectively controlling the prime mover, the first and second drive wheel, and the forklift height adjustment mechanism;
   a trailer having a flat bed with a forward end and a ramp end opposite the forward end, a powered hand truck receptacle disposed in the flat bed of the trailer, adjacent the ramp end thereof, and defining a horizontal floor surface, the powered hand truck receptacle being dimensioned and configured to support the powered hand truck;

a downward and rearward sloping ramp extending from the ramp end of the flat bed, the ramp having a rearward end and a central area, the central area having a rearward end aligned with the rearward end of the ramp and a forward end aligned with the powered hand truck receptacle; and first and second container support dolly sets, each dolly set including a pair of wheels and a single fork tine extending from between the wheels.

2. The container transport system according to claim 1, wherein the container support dolly sets are height adjustable.

3. The container transport system according to claim 1, further comprising a ramp extension and gate hingedly attached to the rearward end of the ramp of the truck.

4. A container transport system, comprising:
a powered hand truck;
a vehicle, comprising:
   a flat bed having a forward end and a ramp end opposite the forward end;
   a downward and rearward sloping ramp extending from the ramp end of the flat bed, the ramp having a rearward end;
   a powered hand truck receptacle disposed in the flat bed of the vehicle, adjacent the ramp end thereof, and defining a horizontal floor surface, the powered hand truck receptacle being dimensioned and configured to support the powered hand truck, wherein the floor surface has a rearward end being contiguous with the rearward end of the ramp, and an opposite forward end that is aligned with the ramp end, whereby the plane of the floor surface is essentially parallel to the flat bed; and
   a downward and rearward sloping ramp extension hingedly attached to the rearward end of the ramp; and
first and second container support dolly sets.

5. A method of level loading a portable storage unit on a flat bed for transporting, comprising the steps of:
(a) providing a powered hand truck having a forklift height adjustment mechanism with a pair of laterally spaced apart fork tines extending from the forklift height adjustment mechanism, and a control system;
(b) providing a flatbed vehicle, the vehicle including:
   i) a flat bed having a forward end and a ramp end opposite the forward end;
   ii) a powered hand truck receptacle disposed in the flat bed of the vehicle, adjacent the ramp end thereof, and defining a horizontal floor surface, the powered hand truck receptacle being dimensioned and configured to support the powered hand truck, wherein the floor surface has a rearward end being contiguous with the rearward end of the ramp, and an opposite forward end that is aligned with the ramp end, whereby the plane of the floor surface is essentially parallel to the flat bed;
   iii) a downward and rearward sloping ramp extending from the ramp end of the flat bed, the ramp having a rearward end;
   iv) a downward and rearward sloping ramp extension hingedly attached to the rearward end of the ramp; and
(c) providing first and second container support dolly sets;
(d) removing the powered hand truck from the powered hand truck receptacle;
(e) installing the container support dolly sets to one end of a portable storage unit;
(f) lifting the end of the portable storage unit opposite the dolly sets, using the powered hand truck to an essentially horizontal position;
(g) maneuvering the powered hand truck and positioning the end of the portable storage unit having the dolly sets installed thereon at the ramp of the vehicle;
(h) pushing the portable storage unit up the ramp and onto a flat bed of the vehicle, using the powered hand truck;
(i) adjusting the forklift height adjustment mechanism of the powered hand truck to keep the portable storage unit level, horizontal orientation as the portable storage unit moves up the ramp of the flat bed; and
(j) positioning the end of the portable storage unit having the dolly sets installed thereon, adjacent to the forward end of the flat bed of the vehicle.

* * * * *